United States Patent [19]
McAnally, III

[11] 3,766,719
[45] Oct. 23, 1973

[54] PARTICLE AND MOISTURE SEPARATOR FOR ENGINE INLET

[75] Inventor: William J. McAnally, III, Lake Park, Fla.

[73] Assignee: United Aircraft Corporation, East Hartford, Conn.

[22] Filed: Nov. 26, 1971

[21] Appl. No.: 202,277

[52] U.S. Cl. ............... 55/306, 55/457, 60/39.09 P, 244/53 B, 415/121
[51] Int. Cl. .......................................... B01d 45/04
[58] Field of Search ................... 55/306, 456, 457; 60/39.09 R, 39.09 P, 39.09 D, 391, 392, 396; 244/53 B; 137/15.1, 15.2; 415/121 G

[56] References Cited
UNITED STATES PATENTS

| | | | |
|---|---|---|---|
| 3,148,043 | 9/1964 | Richardson et al. | 55/306 |
| 3,338,049 | 8/1967 | Fernberger | 55/306 |
| 3,362,155 | 1/1968 | Driscoll | 55/457 |
| 3,469,566 | 9/1969 | Wilkinson et al. | 55/457 |
| 3,616,616 | 11/1971 | Flatt | 55/306 |
| 3,329,377 | 7/1967 | Peterson et al. | 55/306 |
| 3,513,641 | 5/1970 | Hooper et al. | 55/306 |

Primary Examiner—Bernard Nozick
Attorney—Jack N. McCarthy

[57] ABSTRACT

An improved separator for removing particles and moisture from the air entering the inlet to a gas turbine engine is disclosed and comprises a specially contoured passageway upstream of and in communication with the engine inlet. The passageway accelerates uncleaned air received into its inlet to a high axial velocity at a throat region, turns the air rapidly inward toward the separator axis with minimum pressure loss, splits the air flow into inner and outer streams by means of a splitter precisely located downstream of and radially inward of the throat, separates particles and moisture from the air into the outer stream due to their increased momentum from the high velocity developed at the throat region, and accumulates said particles and moisture in said air stream for later removal from the separator. In one embodiment specially cambered swirl vanes are provided upstream of the throat to increase the efficiency of the separator.

2 Claims, 3 Drawing Figures

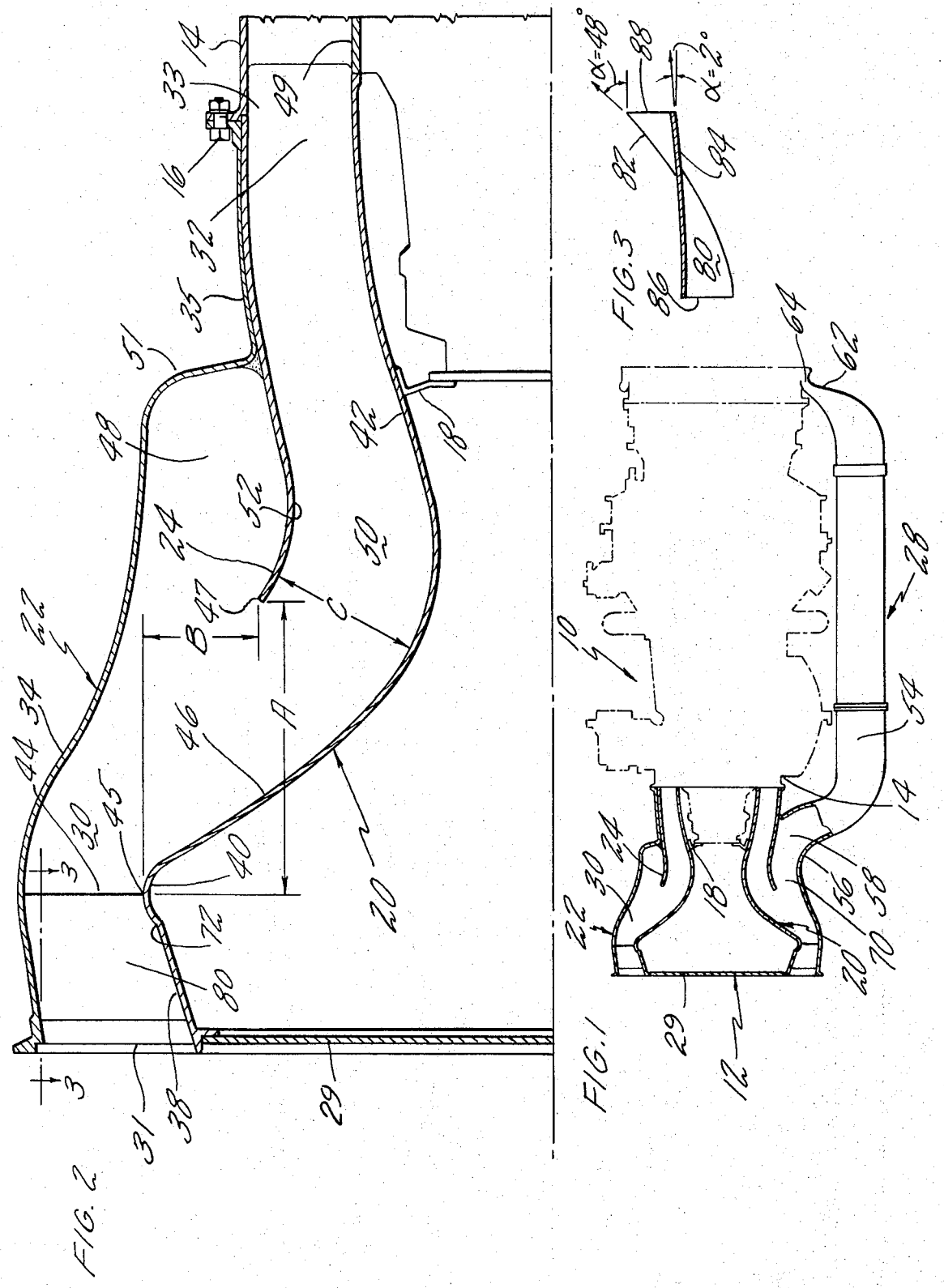

PARTICLE AND MOISTURE SEPARATOR FOR ENGINE INLET

The invention disclosed herein was made in the course of or under a contract with the Department of the Army.

BACKGROUND OF THE INVENTION

Field of the Invention

This invention relates to foreign particle separation and more particularly to particle separation in inlet airflow to gas turbine engines.

Description of the Prior Art

It is well known that foreign particle ingestion into the inlet of a gas turbine engine can cause serious damage to the engine and its components. Engines used on helicopters are particularly susceptible to such ingestion due to the variety of terrain on which a helicopter must land and from which it must take off. For example, in a desert the ingestion of sand would be a particular problem; on the ocean, the ingestion of salt and moisture could have serious consequences over a period of time; and, in jungle terrain, leaves and other foliage might present a serious problem.

These problems have been well recognized, and the prior art is abundant with techniques which claim to solve them. U.S. Pat. No. 3,148,043 to Richardson et al shows a particle remover which separates moisture and solid particles in two separate steps: first, it drains moisture, which accumulates on a center body, through openings in the center body downstream of the inlet; second, it removes particles by bouncing them off the center body onto the inner surface of an outer cowling and thence into an annular receptacle, relying on centrifugal force and the coefficient of restitution of the particles to achieve separation. A separator disclosed in U.S. Pat. No. 3,521,431 to Connors et al relies on centrifugal force and flow direction to throw heavier than air particles upon the inner curved wall of a radial inflow bell mouth shaped annular air inlet. These particles are intercepted by a wall and eventually ejected from the engine. Due to the manner of turning the inlet air into the engine gas path, the Connors et al device may have high pressure losses.

The accumulation of ice on the internal surfaces of an inlet particle separator is often another serious problem. The prior art separators, unless they are provided with special de-icing apparatus, may not be able to be used under conditions where icing may occur. For this reason, most separators are provided with de-icing apparatus adding to their complexity, weight, and cost.

SUMMARY OF THE INVENTION

Accordingly an object of the present invention is improved separation of foreign particles and moisture from the air entering the inlet of a gas turbine engine.

Another object of the present invention is to remove solid particles and moisture from engine inlet air with high separation efficiency and with a very small pressure loss.

A further object of the present invention is to provide a lightweight, inexpensive, uncomplicated particle and moisture separator which needs no special de-icing apparatus when used under icing conditions and which has no moving parts.

In further accord with the above, the present invention receives uncleaned air into a passageway, imparts a high axial velocity to said air by means of a throat, suddenly changes the direction of flow with minimum pressure losses, and separates foreign substances unable to negotiate said sudden change in flow direction due to their momentum by properly positioning a flow splitter downstream of and radially inward of said throat.

One feature of this invention is a flow turning ramp at the throat which is designed to produce a Coanda wall attachment effect during the sudden change in flow direction. The Coanda effect is the tendency of air to follow the surface of a wall when discharged adjacent to said wall despite a sudden change in the direction of the wall away from the axis of discharge. Optimizing this effect by properly curving said wall significantly reduces the pressure losses generally associated with a sudden change in flow direction.

A further feature of this invention is that most moisture and particles which may attach itself to the wall of the separator upstream of the throat are separated from the wall at the throat by the high velocity air at that location; the moisture and particles travel downstream with the other foreign particles and are separated from the main airflow by said splitter. This effect may be improved by putting a discontinuity or slight jog in the wall of the separator just upstream of the throat. This discontinuity energizes the boundary layer, aiding the removal of moisture and any other particles caught in said boundary layer which might otherwise travel with the boundary layer along the wall past the throat and into the engine inlet.

Another feature of this invention is that inherent anti-icing capability may be provided without additional apparatus by properly choosing: the slope of the wall at the inlet of the separator; the throat velocity; and, the slope of the passageway wall downstream of the throat.

Yet another feature which may be incorporated in this invention are swirl vanes upstream from the throat for imparting additional velocity to foreign particles in a direction tangential to the separator axis for increased separation efficiency. These vanes are uniquely constructed in that their camber decreases from root to tip for reasons which are hereinafter explained.

The foregoing and other objects, features and advantages of the present invention will become more apparent in the light of the following detailed description of a preferred embodiment thereof as illustrated in the accompanying drawings.

BRIEF DESCRIPTION OF THE DRAWINGS

FIG. 1 is a side elevational, partly sectioned view of a separator in accordance with the present invention, showing the invention in relation to a typical gas turbine engine.

FIG. 2 is an elevational, fragmentary sectional view of the separator of FIG. 1.

FIG. 3 is a sectional view taken along line 3—3 of FIG. 1.

DESCRIPTION OF THE PREFERRED EMBODIMENT

Referring to FIGS. 1 and 2, a gas turbine engine is shown in phantom outline and is generally represented by the numeral 10. The inlet particle separator of the present invention is represented generally by the numeral 12 and is mounted on the front end 14 of the engine 10 by suitable means such as bolts 16 and annular support ring 18 and has an axis coincident with the engine axis. The separator 12 comprises basically a center body 20, a shroud 22, a splitter 24, and an ejector system generally represented by the numeral 28. The ejector system is shown only by way of example and is not considered a part of the present invention; once the particles have been separated from the air, any number of well known means may be used to move them from the separator.

In this embodiment, the shroud 22 and center body 20 are essentially surfaces of revolution; however, it should be appreciated that the shroud and center body need not be circular in cross section. For example, they may be rectangular in cross section. Also, the surface of the shroud 22 may have local depressions and dimples to accommodate packaging envelope requirements for other equipment which may be mounted on the outside of the shroud. The center body 20 is closed at 29. The shroud 22 is spaced radially outward from the center body 20 to form an annular passageway 30 having an inlet 31 and an exit 32 in communication with the engine inlet 33. A full annulus is preferable from the standpoint of losses and efficiency of the system; however, if other requirements dictate, less than a full 360° annulus may be used. A radial inflow passageway inlet may also be used.

The shroud 22 comprises an upstream and downstream wall 34, 35, respectively. The center body 20 comprises an inlet cone 38, a flow turning ramp 40, and a downstream wall 42. The inlet cone 38, as it extends downstream, diverges away from the separator axis preferably at an angle of from 12° to 15° as measured between the axis and a line tangent to the cone, to eliminate stagnation regions along the cone for preventing the accumulation of ice on the surface of the cone. The upstream wall 34 of the shroud 22 and the downstream end of the inlet cone 38 forms a throat region 44 and a throat 45. Immediately downstream of said throat 45 the center body surface turns rapidly radially inward by means of the flow turning ramp 40. The ramp 40 is a smoothly curved surface which is tangent at its downstream end to a sloped wall 46. The sloped wall 46 blends smoothly into the center body downstream wall 42 which in turn is blended smoothly into the inner wall 49 of the engine inlet 33 as shown in FIG. 2. Gradual contour changes are preferred wherever possible to reduce pressure losses. The shroud upstream wall 34 also turns radially inward immediately downstream of the throat 45 and at the same time diverges with respect to the wall 46; also, its angle of convergence with respect to the separator axis preferably does not exceed 30°, as measured between the axis and a line tangent to the cone, to prevent the accumulation of ice thereon.

The splitter 24 is positioned radially between the shroud upstream wall 34 and the center body downstream wall 42, at a predetermined location downstream and radially inward of the throat 45. The splitter thus forms outer and inner annular passageways 48, 50, respectively. The outer annular passageway 48 is blocked by a wall 51 (which in this instance is the downstream end of the shroud wall 34) and accumulates foreign substances therein, in a manner hereinafter more particularly described. The inner annular passageway 50 directs cleaned air into the engine inlet 33. The radial velocity distribution of the air entering the inner annular passageway 50 can be preset by properly shaping the leading edge 47 and the inner surface 52 of the splitter 24 to arrive at a desirable radial velocity distribution at the engine inlet 33.

In this embodiment, the ejector system 28 comprises two scavenge ducts 54 (only one being shown) located near the bottom of the engine. The forward end 56 of each duct is connected to an opening 58 in the rear wall 51 of the outer annular passageway 48. The rearward end 62 of each duct 54 forms a nozzle 64 which is connected to the exhaust duct of the engine.

In operation, the separator 12 receives uncleaned air into its inlet 31 and accelerates it to a high velocity at the throat region 44. Particles in the air, now having a high velocity and hence an increased momentum, are unable to negotiate the sudden change in flow path direction downstream of the throat. Their increased momentum keeps them traveling in a substantially straight line whereupon they enter the outer annular passageway 48. Foreign matter entering the outer annular passageway 48 falls to the bottom 70 of the passageway due to gravity where it collects until removed. In this embodiment, the engine exhaust flowing past the scavenge duct nozzle 64 creates a suction in the duct 54 which removes all of the foreign matter collected in the passageway and ejects it into the engine exhaust system.

As stated, the flow turning ramp 40 is designed to take advantage of the Coanda effect. This effect actually helps turn the air and, if optimized, reduces the pressure losses associated with flow turning to a minimum. In this regard, the slope of the wall 46 tangent to the ramp 40 is an important factor; if the slope is too steep there may be separation of the flow from the wall with a resulting increase in pressure losses. Because the inner annular passageway height C must be of a certain size to provide the cross-sectional area required to permit a proper flow of air through said passageway to the engine inlet 33, the preferred ratio A/B, hereinafter defined, indirectly establishes the preferred slope of the wall 46.

Let A represent the axial distance between the throat 45 and the splitter's leading edge 47, and let B represent the difference in radius, as measured from the engine axis, between the throat and the leading edge 47. Tests show that if an acceptable balance between particle separation efficiency and system efficiency (pressure drop) is to be attained then A should be several times greater than B. A ratio for A/B of 2.0 results in a separation efficiency of 88.0 percent with a pressure drop of 5.2 in. $H_2O$; and a ratio of 4.0 results in a separation efficiency of 83.5 percent with a pressure drop of 2.5 in. $H_2O$. In this embodiment a ratio of 2.5 was deemed most preferable in view of system requirements. Using this ratio results in particle separation efficiency of 85.0 percent and a pressure drop of only 3.0 in. $H_2O$ (equivalent to a system efficiency loss of about three-fourths of a percent).

Returning now to the throat region 44, tests have shown that increasing the velocity of the air at the throat region increases pressure losses due to the increased difficulty of turning the air at higher velocities; however, as might be expected, a higher velocity results in more efficient separation of the particles. For lower velocities to achieve the same separation efficiency as the higher velocities the percent of the total air flow which must pass into the outer passageway 48 (percent scavenge flow) must be significantly increased. For example, a throat velocity of 160 feet per second results in a pressure loss of only 2.4 inches $H_2O$, but requires a 40 percent scavenge flow to achieve 85 percent separation efficiency; whereas, a 240 feet per second throat velocity has a 5.2 inches $H_2O$ pressure drop but requires only a 17 percent scavenge flow to achieve an 85 percent separation efficiency. Other test data shows that for the inlet separator to have inherent anti-icing capability the throat velocity must be at least 200 feet per second. With these results in mind, the throat 45 in this preferred embodiment was sized to produce a throat velocity of 220 feet per second. This throat velocity in combination with an A/B ratio equal to 2.5 and a scavenge flow of only 20 percent results in a separation efficiency of 85 percent with a pressure loss of only 3.0 inches $H_2O$.

Some of the smaller foreign particles and especially moisture may become caught in a boundary layer on the surface of the cone 38. For this reason, a discontinuity 72 is provided in the inlet cone 38 immediately upstream of the throat 45. This discontinuity energizes the boundary layer and assures that the moisture and particles in the boundary layer are released therefrom so as to be driven into the outer passageway 48 by the high velocity air at the throat region 44. Without this discontinuity some foreign substances might remain within the boundary layer and be carried around the flow turning ramp 40 and into the engine compressor inlet.

Swirl vanes are sometimes used in separators to increase the centrifugal forces acting on foreign substances in the air, thereby moving the substances in a desired direction. Generally, however, swirl vanes within a particle separator such as the one described herein are undesirable for at least three important reasons, even though utilization of such vanes may increase separation efficiency significantly. First, they present an icing problem and would most likely require the incorporation of vane anti-icing hardware; second, foliage may be caught by the vanes and could block the separator flow path; and, third, vanes create additional pressure losses. However, if the separator is operated in an environment where icing and foliage ingestion conditions do not exist then additional separation efficiency may be desirable despite the increase in pressure loss. One vane 80 of a row of swirl vanes is shown in FIG. 2 and comprises a root 82, tip 84, leading edge 86 and trailing edge 88; its trailing edge 88 is, in this embodiment, located at the throat 45. These vanes 80 are uniquely constructed to provide a high increase in separation efficiency with a minimum increase in pressure drop. In view of the location of the splitter 24, particles entering the separator nearest the separator axis are the particles most likely to miss the inlet to the outer annular passageway 48 and to be swept into the inner annular passageway 50. Conversely, the particles nearest the shroud wall 34 are the most likely to enter the outer annular passageway 48. It thus follows that it is desirable to force particles toward the wall 34 to increase their chances for entering the outer annular passageway 48. For this reason, the swirl vanes 80 vary in camber from root 82 to tip 84 to provide maximum swirl in the vicinity of the root 82 where it is most needed, and to provide essentially no swirl at the tip 84 where it is not needed; this keeps the overall increase in pressure drop at a minimum. As shown in FIG. 3, thin sheet metal vanes are used in this embodiment; however, vanes having an airfoil section may be used if desired. In this embodiment the vanes 80 are oriented such that at their leading edge 86 they are parallel to the separator axis, although this is not mandatory. Separation efficiency is optimized and pressure losses are minimized with a camber angle $\alpha$ varying from 48° at the root 82 to 2° at the tip 84. This results in an increase in separation efficiency of about five percentage points with an increase in pressure loss of only 0.5 in. $H_2O$.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. A particle separator having an axis, adapted to be mounted to the upstream end of a gas turbine engine, for removing moisture and foreign particles from the inlet air flow to the engine, the separator comprising:

an inner wall, substantially circular in cross section,
an outer wall, substantially circular in cross section, surrounding said inner wall and forming a passageway therebetween, said inner wall including an inlet portion diverging in a downstream direction away from the separator axis while converging toward said outer wall to form a throat to accelerate incoming air to a high velocity in a substantially axial direction, said inner wall at said throat including a flow turning ramp, said ramp contour minimizing boundary layer separation at said throat to optimize the Coanda effect, said inner wall also including a downstream portion downstream of said ramp concomitantly converging toward the separator axis and diverging from said outer wall, the downstream end of said ramp being tangent to said downstream portion,
splitter means disposed between said inner and outer walls, splitting said passageway into inner and outer passages, said inner passage adapted to communicate with the inlet of the engine and said outer passage adapted to accumulate moisture and foreign particles removed from the air, the leading edge of said splitter means being located downstream of and radially inward of said throat, the axial distance between said throat and said leading edge being two to four times greater than the difference in radial location between said throat and said leading edge, and
means connected to said outer passage for removing accumulated moisture and foreign particles from said outer passage.

2. A particle separator according to claim 1 wherein said inlet portion of said inner wall has a discontinuity immediately upstream of said flow turning ramp to energize the boundary layer at that point for shaking loose moisture and foreign particles trapped in the boundary layer.

* * * * *